United States Patent
Sim et al.

(10) Patent No.: US 7,898,996 B2
(45) Date of Patent: Mar. 1, 2011

(54) WIRELESS NETWORK SYSTEM AND COMMUNICATION METHOD IN A WIRELESS NETWORK

(75) Inventors: Dong Hi Sim, Seoul (KR); Ji Young Huh, Yongin-si (KR); Jae Young Lee, Gwangmyeong-si (KR); Sook Hyun Yang, Seoul (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 565 days.

(21) Appl. No.: 11/872,269

(22) Filed: Oct. 15, 2007

(65) Prior Publication Data

US 2008/0170519 A1    Jul. 17, 2008

(30) Foreign Application Priority Data

Jan. 15, 2007 (KR) ......................... 10-2007-0004544

(51) Int. Cl.
  *H04B 7/00* (2006.01)
(52) U.S. Cl. .......... 370/311; 370/312; 370/338; 370/432
(58) Field of Classification Search .................. 370/310, 370/311, 312, 328–338, 432
  See application file for complete search history.

(56) References Cited

U.S. PATENT DOCUMENTS

| | | |
|---|---|---|
| 2005/0245215 A1 | 11/2005 | Abhishek |
| 2006/0080517 A1 | 4/2006 | Brown |
| 2006/0126533 A1 | 6/2006 | Wang |
| 2008/0049703 A1* | 2/2008 | Kneckt et al. ................. 370/342 |
| 2008/0062948 A1* | 3/2008 | Ponnuswamy ............... 370/342 |
| 2008/0151814 A1 | 6/2008 | Jokela |

OTHER PUBLICATIONS

Kim, H.D., et al., "Enhanced Power-Saving Mechanism for Broadcast and Multicast Service in WLAN", IEEE Communications Letters, vol. 9, No. 6, pp. 520-522, Jun. 2005.
Kim, H.D., et al., "A New Power-Saving Mechanism for WLAN Broadcast/Multicast Services", IEEE 63rd Annual Vehicular Technology Conference, pp. 7-11, May 7, 2006.
Jokela, J., et al., "Broadcast and Multicast Enhancements," Doc. IEEE 802.11-05/1075r0, Nov. 2005, XP-003010791.
Ponnuswamy, S., et al., "Air Efficiency and Reliability Enhancements for Multicast," Doc. IEEE 802.11-06/1454r0, Sep. 19, 2006, XP-002612324.
Ponnuswamy, S., et al., "Air Efficiency and Reliability Enhancements for Multicast Frames," Doc. IEEE 802.11-06/1398r1, Sep. 20, 2006, XP-002612325.
Huh, J.Y., et al., "FBMS Termination Proposal," IEE P802.11 Wireless LANs, Doc. IEEE 802.11-05/1120r6, Jan. 15, 2007, XP-002612383.

* cited by examiner

*Primary Examiner* — Ricky Ngo
*Assistant Examiner* — Pao Sinkantarakorn
(74) *Attorney, Agent, or Firm* — Lee, Hong, Degerman, Kang & Waimey

(57) ABSTRACT

Disclosed is a wireless network system and a method for sending and receiving various information and data related to broadcast or multicast services in a wireless network.

6 Claims, 6 Drawing Sheets

WIRELESS NETWORK SYSTEM AND COMMUNICATION METHOD IN A WIRELESS NETWORK

CROSS-REFERENCE TO RELATED APPLICATIONS

The present application claims priority from Korean Patent Application No. 10-2007-0004544, filed in Korea on Jan. 15, 2007, the entire contents of each is incorporated herein by reference.

BACKGROUND

1. Field of the Invention

The present invention relates to a wireless network system and a method for sending and receiving various information and data related to broadcast or multicast services in a wireless network.

2. Description of the Related Art

Recently, with the rapid spread of a wireless network environment, various broadcast or multicast services have been served by a wireless network.

SUMMARY

Accordingly, the present invention provides a wireless network system and a method for transmitting and receiving various information and data related to broadcast or multicast services in a wireless network.

In an aspect, there is provided a method of performing FBMS operation for a station in a wireless communication system, the method comprising: constructing a FBMS request containing one or more FBMS element which comprises at least delivery interval field; and transmitting the FBMS request to the access point with which it is associated, wherein the FBMS request is without that FBMS element contained in it or includes that FBMS element for which the delivery interval is set to 0, to indicate that it is no longer using the FBMS element.

The method further comprises; receiving from the access point a FBMS response with the FBMS Element status field value set to set to the value which indicates the definition for "Accept" upon receipt of the FBMS Request frame.

The FBMS element of the FBMS request further comprises TCLAS Elements, TCLAS Processing Element and Multicast Rate fields along with, Delivery Interval field.

According to another aspect of the present invention, there is provided a method of performing FBMS operation for an access point in a wireless communication system, the method comprising: receiving, from the station with which it is associated, a FBMS request containing one or more FBMS element which comprises at least delivery interval field, wherein the FBMS request is without that FMBM element contained in it or includes that FBMS element for which the delivery interval is set to 0, to indicate that it is no longer using the FBMS element; and transmitting to the station a FBMS response containing one or more FBMS element with the FBMS Element status field in response to an FBMS Request frame.

The FBMS element of the FBMS request further comprises one or more of TCLAS Elements, TCLAS Processing Element and Multicast Rate fields along with Delivery Interval field.

The FBMS element of the FBMS response further comprises one or more of Delivery Interval, FBMSID, FBMS Counter, Multicast Rate, Multicast Address, Multicast Diagnostic Interval fields along with the FBMS Element status field.

According to still another aspect of the present invention, there is provided a station for performing FBMS operation in a wireless communication system, the station comprising: a constructing means for constructing a FBMS request containing one or more FBMS element which comprises at least delivery interval field; and a transmitting means for transmitting the FBMS request to the access point with which it is associated, wherein the FBMS request is without that FBMS element contained in it or includes that FBMS element for which the delivery interval is set to 0, to indicate that it is no longer using the FBMS element.

The station further comprises a receiving means for receiving from the access point a FBMS response with the FBMS Element status field value set to set to the value which indicates the definition for "Accept" upon receipt of the FBMS Request frame.

The FBMS element of the FBMS request further comprises TCLAS Elements, TCLAS Processing Element and Multicast Rate fields along with, Delivery Interval field.

According to still another aspect of the present invention, there is provided an access point for performing FBMS operation in a wireless communication system, the access point comprising: a receiving means for receiving, from the station with which it is associated, a FBMS request containing one or more FBMS element which comprises at least delivery interval field, wherein the FBMS request is without that FMBM element contained in it or includes that FBMS element for which the delivery interval is set to 0, to indicate that it is no longer using the FBMS element; and a transmitting for transmitting to the station a FBMS response containing one or more FBMS element with the FBMS Element status field in response to an FBMS Request frame.

The FBMS element of the FBMS request further comprises one or more of TCLAS Elements, TCLAS Processing Element and Multicast Rate fields along with, Delivery Interval field.

The FBMS element of the FBMS response further comprises one or more of Delivery Interval, FBMSID, FBMS Counter, Multicast Rate, Multicast Address, Multicast Diagnostic Interval fields along with the FBMS Element status field.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION

Hereafter, embodiments of the present invention will be explained in detail with reference to the accompanying drawings. Further, a wireless RAN system among wireless network systems will be explained as one example of the embodiments of the present invention.

However, the embodiments of the present invention may be applied to the wireless RAN system as well as various wireless network systems. Terms or words used for the embodiments of the present invention may be used as different terms or words in the various wireless network system. Accordingly, if practicable meanings of the terms or words are the same or similar, the terms or words are regarded as the same.

Figure 1A:
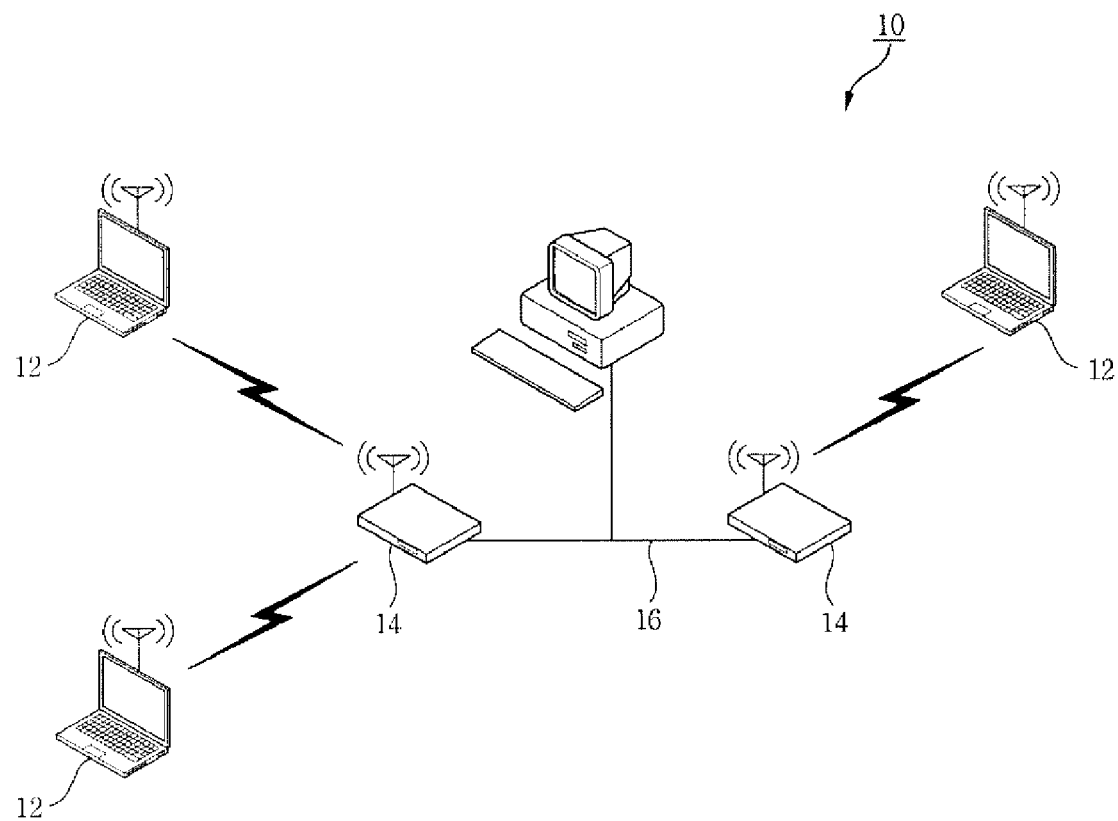
FIGS. 1A and 1B are a concept diagram illustrating a wireless network system according to an exemplary embodiment of the present invention.
Figure 1B:
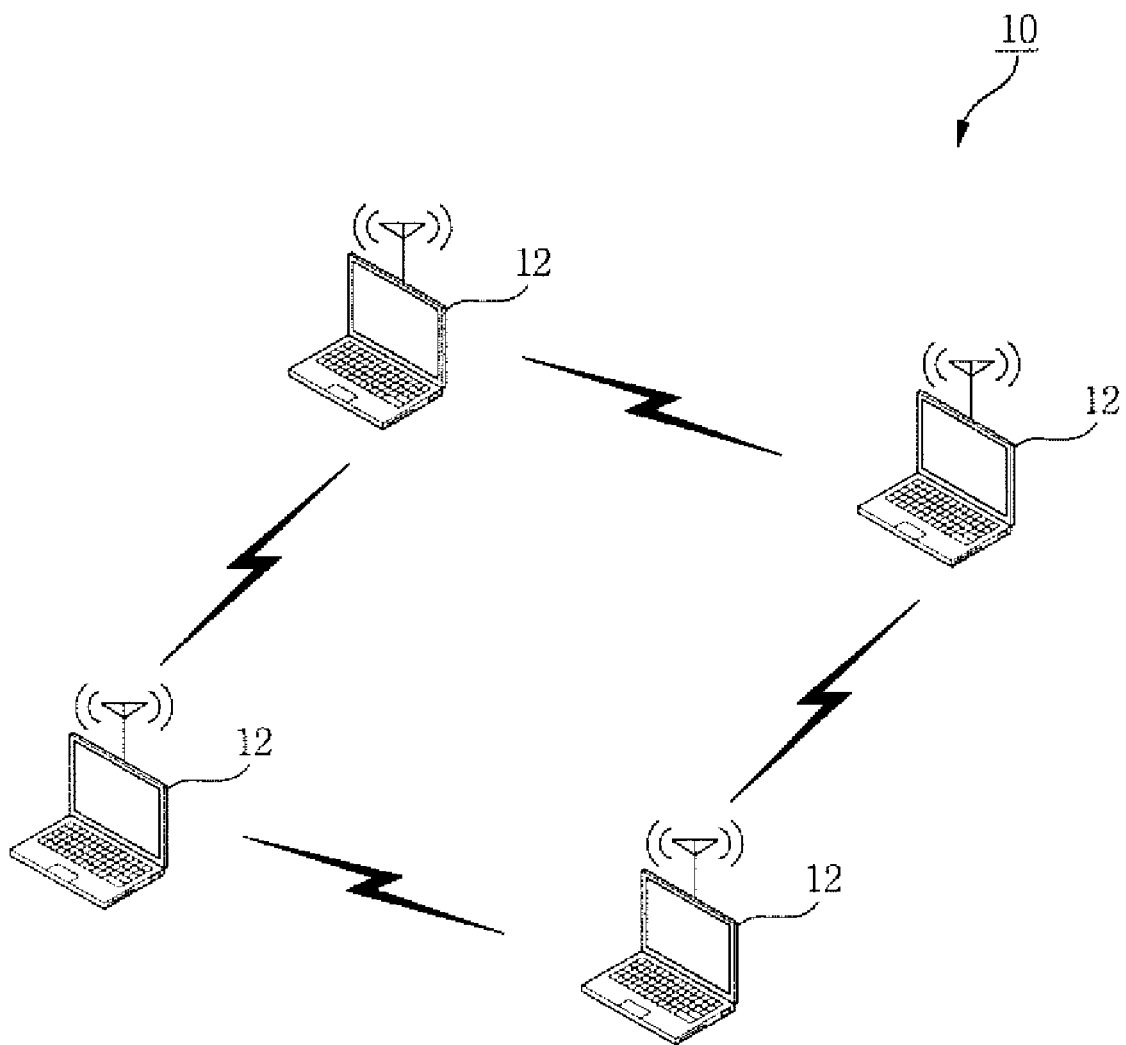

FIGS. 1A and 1B are a concept diagram illustrating a wireless network system according to exemplary embodiments of the present invention. The same constituent elements of FIGS. 1A and 1B use the same drawing number.

Referring to FIG. 1A, a wireless network system, for example, a wireless RAN system 10 includes a plurality of stations or terminals 12, an access point or wireless base station 14 and a backbone network or a distribution system 16.

The plurality of stations 12 mounts a network interface card for a wireless RAN to perform an operation of a physical layer and a MAC layer based on IEEE 802.11 standard. In the wireless RAN system 10 of FIG. 1A, the plurality of stations 12 is connected to the access point 14 to transmit a data frame.

The access point 14 performs wire and wireless interworking bridge function for relaying a frame transmitted from one station to other station. The access point 14 performs the same function as a bridge or a switch of an Ethernet.

Further, the access point 14 basically includes the same the physical layer and MAC layer as the above-described station 12. Thus, the access point 14 can basically perform the same operation as the station 12. As a result, the access point 14 can be regarded as the same as the station 14, if necessary.

The station 12 and/or the access point 14 which performs an FBMS operation in a wireless communication system, may comprise many kinds of means for performing a FBMS procedure.

The means for performing the FBMS procedure may be implemented by software, hardware or their combination in the station 12 or the access point 14. The means performs all or part of steps which comprise the FBMS procedure.

The distribution system 16 is the backbone network that connects the plurality of access points 14. The distribution system 16 usually uses the Ethernet, but may connect the plurality of access points 14 in wireless. The distribution system 16 may broadly include a router or a switch connected to the Ethernet, and a plurality of servers connected to a wire and wireless internet network.

Referring to FIG. 1B, the wireless network system, for example, the wireless RAN system 10 includes the plurality of stations or terminals 12. The wireless RAN system 10 is connected to point-to-point directly between stations 12. Accordingly, the wireless RAN system 10 shown in FIG. 1B does not include a separate access point 14 and the distribution system 16, differently from the wireless RAN system 10 of FIG. 1A. However, the plurality of stations 12 in the wireless RAN system 10 can perform functions of the separate access point 14 and the distribution system 16. Also, a part of functions of the separate access point 14 and the distribution system 16 may be omitted.

Although the wireless RAN system 10 is explained with reference to FIGS. 1A and 1B, the wireless network system including the wireless RAN system 10 according to one embodiment of the present invention is not limited thereto, and may be implemented with their combination or a separate system. The wireless network system according to one embodiment of the present invention can exist independently, and interwork between a different wireless network system a mobile communication network and a wire and wireless internet network.

For example, the wireless RAN system can provide a roaming service by interworking with a wideband code division multiple access (WCDMA). Specially, when the wireless RAN system provide a voice service, a dual band dual mode (DBDM) terminal supporting both the wireless RAN and the WCDMA performs voice call on the mobile communication network and simultaneously perform seamless automatic roaming on the wireless RAN system.

The wireless RAN systems 10 shown in FIGS. 1A and 1B can transmit data via a connection process between the stations 12 or between the station 12 and the access point 14.

Connection Procedure

Figure 2:
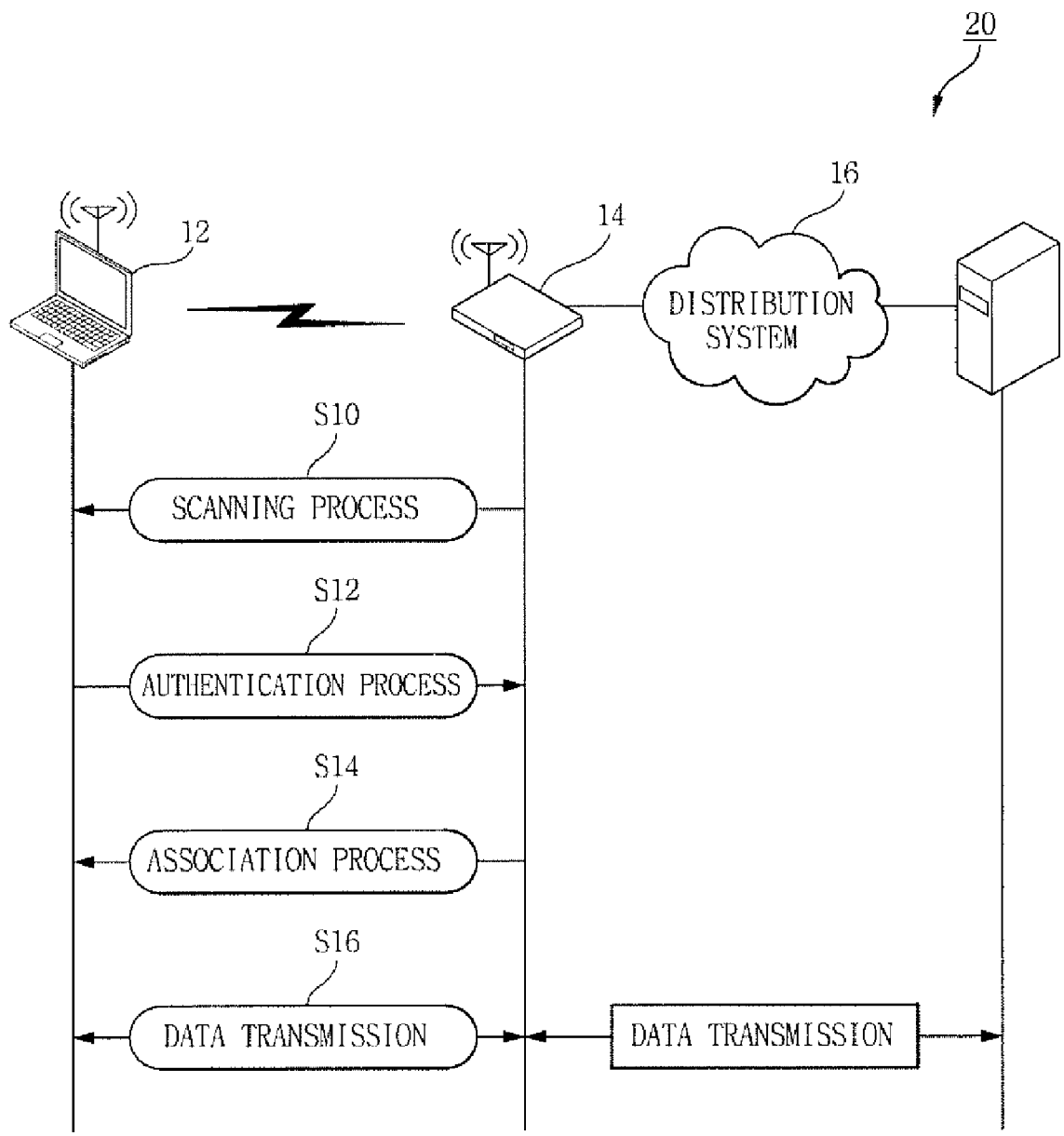
FIG. 2 is a procedure diagram illustrating a connection operation for transmitting data in a wireless RAN system shown in FIG. 1A.

FIG. 2 is a procedure diagram illustrating a connection process for transmitting data in a wireless RAN system shown in FIG. 1A. The wireless RAN system and various wireless network system of FIG. 1B are partly different from those of FIG. 2. However, the wireless RAN system and various wireless network system of FIGS. 1B and 2 respectively include the connection process for transmitting the same data. Accordingly, the concrete explanation will be explained.

Referring to FIGS. 1A and 2, a connection process 20 for transmitting data between the station 12 and the access point 14 includes a scanning process S10, an authentication process S12, and a association process S14. The station 12 and the access point 14 perform a data transmitting process S16 via the processes S10, S12 and S14.

The scanning process S10 is the process to find out the peer access point (14) using either the beacon or the probe message.

The scanning process S10 includes a passive scanning process for searching for the access point 14 from the beacon message where the access point 14 periodically broadcasts, and a active scanning process for enabling the station 12 to broadcast a probe request message or frame according to each channel and receive a probe response message including one's own service set ID (SSID), an operation speed, and others, from the access point 14, so as to select the corresponding access point 14. The beacon message includes various capabilities (speed, encryption, etc.) capable of being supplied by the access point 14 and one's own service group name (i.e. SSID).

The authentication process S12 verifies that the station 12 selecting the proper access point 14 in the scanning process S10 is effective terminal. In other words, the authentication process S12 is to negotiate the access point 14, an authentication procedure, and an encryption method. Mostly, an open system authentication method is used in the authentication process S12. Accordingly, the access point 14 unconditionally authenticates an authentication request from the station. A reinforced authentication method includes EAP-TLS, EAP-TTLS, EAP-FAST, PEAP, and others.

The association process S14 is a process that the station 12 connects to the access point 14, after completing successfully the authentication. The association process S14 means that an identical association is established between the station 12 and the access point 14. If the association process S14 is completed, the station 12 can communicate with other station 14 via the access point 14.

If the station 12 sends the association request message or frame to the access point 14, the association process S14 is performed by enabling the access point 14 to send an association response message including an association ID (AID) identified with other station.

The station 12 and access point 14 perform a data transmitting process 816 via the processes S10, S12 and S14.

The association process S14 is similar to a reassociation process. The reassociation process is to connect the access point associated with the station 12 to other access point. The reassociation process is to establish a new connection with new access point 14, when a signal from the access point 14 associated with the station 12 becomes weaker.

In the reassociation process, the frame which is stored to the old access point 14 is transferred from the new one 14 to the station 12. In detail, if the station 12 sends to the access point 14 a reassociation request message containing the address of the old access point 14 into the Current AP, the access point sends to the station (12) a reassociation response containing the Association ID (AID) which is a numerical identifier used to logically identify the station 12 to which buttered frames need to be delivered. The new access point 14 requests the IAPP (Inter-AP Protocol) to the old one 14 to send any buffered frames for the station 12.

The station 12 and the access point 14 comprise many kinds of means related to connection procedure. For example, The station 12 and the access point 14 comprises an authenticating means for performing an authentication procedure with another station. These means are implemented by software, hardware or their combination in the station 12 and the access point 14.

Broadcast and Multicast

The broadcast and multicast frames being sent toward one or more receiving station has the simplest frame exchange, because they are not acknowledged. Framing and addressing are a little complicate. Frame types matching with these rules include (1) broadcast data frames having a broadcast address in one address field, (2) multicast data frames having a multicast address in one address field, and (3) broadcast management frames (beacon, probe request, IBSS ATIM frames).

The frames toward group addresses may not be fragmented and also acknowledged. Entire sequence is sent to one frame according to a contention-based access control rule. After completing previous transmission, all stations 12 starts the countdown of a random delay interval on a contention window.

Since the frame exchange is a single frame sequence, NAV is set to "0". If the next frames are not continued, other stations do not need to lock the use of a medium using a virtual carrier-sense mechanism. After sending the frame, all stations wait for during DIFS, and start the countdown during the contention window in order to send next frames.

DTIM (Delivery Traffic Indication Map)

Since the frames having the group address are addressed to a group according to the definition, the frames can not be delivered using a poling algorithm. Accordingly, the frames have mechanisms for the broad and multicast frames. A buffering is the same as a unicast, except that the frames are buffered whenever the stations connected to the access point 14 are sleep. The buffered broad and multicast frames are stored using the AID0. By setting a first bit of a traffic indication map (TIM), the access point 14 indicates which broadcast or multicast frames are buffered. The first bit corresponds to "AID 0".

Each BSS has a parameter such as a DTIM interval. The TIM is sent to all beacons. A specific type of the TIM, i.e., DTIM is sent during a fixed number of beacon intervals. A TIM element in the beacon frame includes a counter for performing the countdown until next DTIM. The counter becomes "0" in the DTIM frame. The buffered broad and multicast traffic is sent after the DTIM beacon.

The plurality of buffered frames is sequentially sent. Many data bits in a frame control field mean that many data should be sent. A channel acquisition rule is applied to the transmission of the buffered frames. The access point 14 can be selected to delay processing of incoming PS-Poll frames until the frames in the broad and multicast transmission buffers are transmitted.

Figure 3:
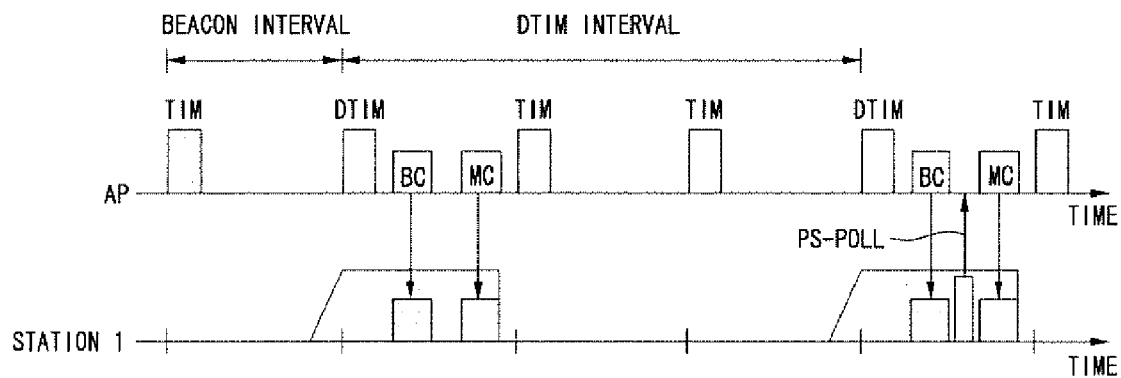
FIG. 3 is a diagram illustrating broadcast and multicast buffer transmission processes after a DTIM, between one access point and one station.

FIG. 3 is a diagram illustrating broadcast and multicast buffer transmission processes after a DTIM, between one access point and a solely connected station.

Since the DTIM interval of the access point 14 is set to "3", there is the DTIM every third TIM. The station is operated to a sleep mode having a listen interval of "3". To receive the buffered broad and multicast frames, the station will be waked up. After transmitting the DTIM frames, the PS-Poll exchange with the connected stations is performed and then the buffered broadcast and multicast frames will be transmitted.

For a second beacon interval, unique broadcast and multicast frames exist in the buffer and are sent to the BSS.

For a fifth beacon interval, the frames are buffered for the station 12. After monitoring the map on the DTIM and deciding the transmission of the buffered broadcast and multicast frames, the PS-Poll is sent.

To receive the broad and multicast frames, the station 12 should be waked up during the transmission of the DTIM.

FBMS (Flexible Broadcast Multicast Service)

Figure 4:
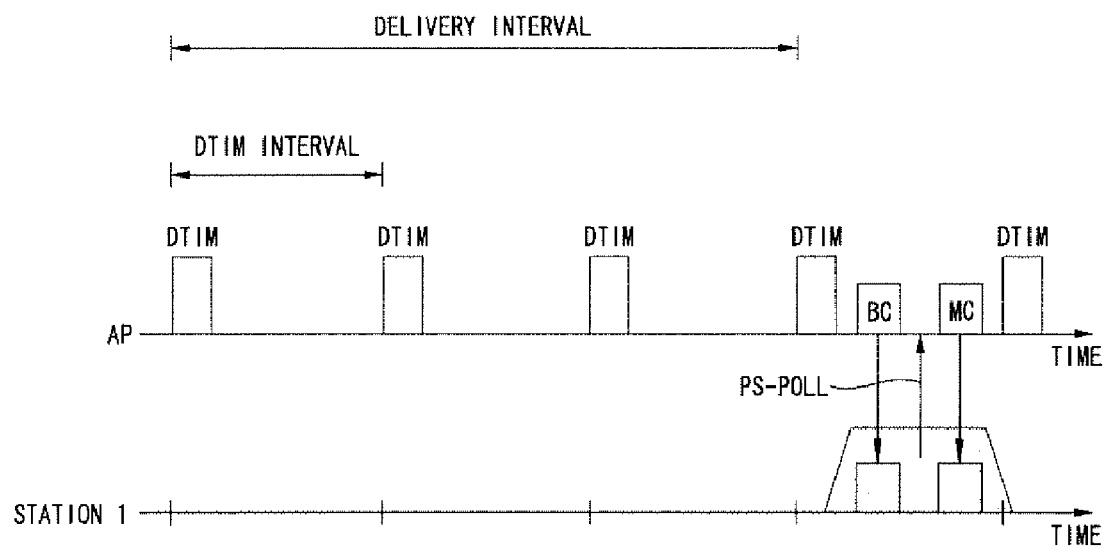
FIG. 4 is a diagram illustrating broadcast and multicast buffer transmission processes of a wireless network system supporting a flexible broadcast multicast service (FBMS)

FIG. 4 is a diagram illustrating broadcast and multicast buffer transmission processes of a wireless network system supporting a flexible broadcast multicast service (FBMS).

As described above, to reduce more consumption power than the transmission of the buffered broadcast and multicast frames after sending the DTIM frames, a delivery interval, which is an integer as many as the DTIM, is set every stream, and the buffered broadcast and multicast frames can be sent during the delivery interval set for each stream. Such a broad and multicast service is called the FBMS.

Figure 5:
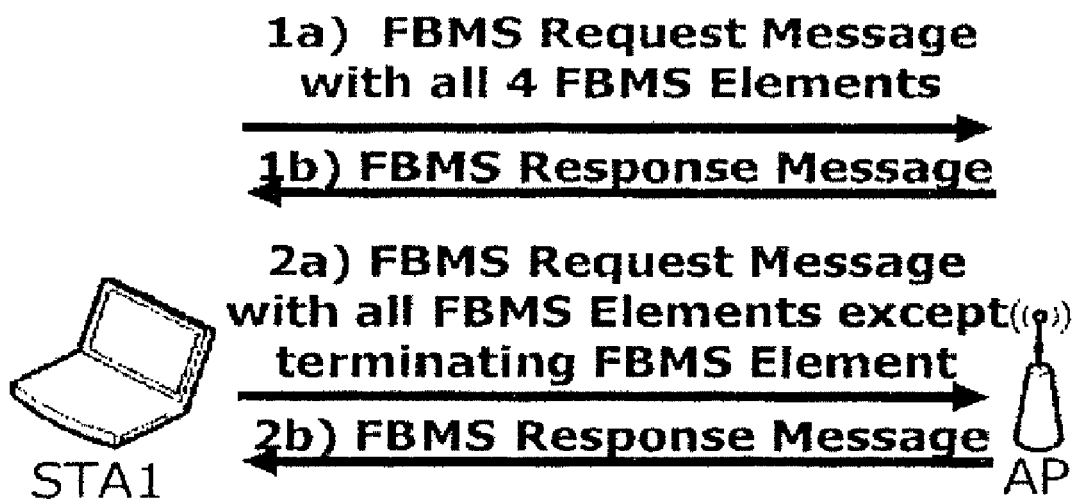
FIG. 5 is a flow chart illustrating processes of the wireless network system supporting the FBMS.

FIG. 5 is a flow chart illustrating processes of the wireless network system supporting the FBMS.

Referring to FIG. 5, in the wireless network system supporting the FBMS, the station (SAT1) transmits all FBMS elements, for example, FBMS request frame or message having four FBMS elements to the access point (AP) and transmits the FBMS response frame or message from the access point (AP), so as to provide the FBMS.

In the wireless network system supporting the FBMS, a non-access point (SAT1) transmits a FBMS request frame except a specific FBMS element to indicate that it is no longer using the specific FBMS element. The access point (AP) sends an FBMS response with the FBMS status value set to "OK" upon receipt of the FBMS request frame.

In other words, all FBMS elements should be included upon the RBMS request and even when the specific element is updated, in order to indicate that the non-access point (SAT1) is no longer using the specific FBMS element.

Further, one of the wireless network systems supporting the FBMS can not solve problems produced when the access point (AP) indicates that it can not provide the FBMS service for the specific FBMS element and the station (SAT1) is down or dead without the end of the FBMS service.

The present invention provides the following solution to the problems of the FBMS service.

1) indicating that the non-access point station does not use the specific FBMS

According to the present invention, the wireless network system and the communication method thereof provide a method of indicating that the non-access point (SAT1) is no longer using the specific FBMS element.

In the wireless network system and the communication method thereof according to one embodiment of the present invention, the access point 14 supplies the FBMS service by using a wireless network management capability information element. The non-access point station 12, which wishes to provide the FBMS, can indicate that it wishes to provide the FBMS by using the wireless network management capability information element.

FBMS Request

The non-access point station (non-AP STA) 12 constructs a FBMS request containing one or more FBMS element. The FBMS Request element defines information about the broadcast/multicast frames requested by the non-access point station (non-AP STA) 12. The format of the FBMS Request element is shown in a table 1.

TABLE 1

|  | Element ID | Length | Multicast Element Count | FBMS Element 1 | FBMS Element n |
|---|---|---|---|---|---|
| Octets: | 1 | 1 | 1 | variable | Variable |

Referring to table 1, the Length field is set to 1+n, where n indicates the total length of all FBMS elements included in the elements.

The multicast element count indicates the number of the FBMS elements present.

The format of the FBMS sub-element is shown in table 2.

TABLE 2

|  | TCLAS Element | Optional TCLAS Element | Optional TCLAS Element | Optional TCLAS Processing Element | Delivery Interval | Multicast Rate |
|---|---|---|---|---|---|---|
| Octets: | Variable | variable | variable | 3 | 1 | 1 |

Referring to table 2, a TCLAS information element defines a broadcast/multicast stream.

The plurality of selective TCLAS elements is allowed to classify the broadcast/multicast stream. The TCLAL processing element defines how multiple TCLAS elements are processed.

The delivery interval field defines the number of DTIMs that the stream is transmitted at. The default value is 1. The value set to "0" indicates that requesting non-access point station 12 does not use the FBMS element anymore.

The multicast rate field specifies the highest data rate at which the station 12 can reliably receive multicast frames. If no value is provided by the station 12, this field is set to "0".

FBMS Response

The point station 14 constructs a FBMS response. The FBMS Response element defines information about the broadcast/multicast status. The format of the FBMS Response element is shown in Table 3.

TABLE 3

|  | Element ID | Length | FBMS Status Element 1 | FBMS Status Element n |
|---|---|---|---|---|
| Octets: | 1 | 1 | 5 | 5 |

Referring to table 3, the length field is set to 1+n, where n indicates the total length of all FBMS elements included in the elements. The format of the FBMS status element is shown in Table 4.

TABLE 4

|  | Element Status | Delivery Interval | Element Reason Code | FBMSID | FBMS Counter n | Multicast Rate | Multicast Address | Multicast Diagnostic Interval |
|---|---|---|---|---|---|---|---|---|
| Octets: | 1 | 1 | 1 | 1 | 1 | 1 | 6 | 4 |

Referring to Table 4, the element status field indicates the status of the access point responding to the delivery interval requested by the station, as indicated in Table 5.

TABLE 5

| Value | Description |
|---|---|
| 1 | Accept |
| 2 | Deny |
| 3 | Override |
| 4-255 | Reserved |

The element reason code field provides additional explanation to the station 12, when the status filed returns "deny" or "override". Values of the element reason code field is defined as indicated in Table 6.

TABLE 6

| Field value | Description |
|---|---|
| 1 | Denied due to malformed request or ambiguous classifier. |
| 2 | Denied due to lack of resources on AP. |
| 3 | Denied due to requested classifier(s) matching 2 or more existing streams on different intervals |
| 4 | Denied. By policy, requested stream is not permitted to participate in FBMS |
| 5 | Overridden due to existing stream with different delivery interval |
| 6 | Overridden due to policy limits on AP. |
| 7 | Overridden due to AP changed the delivery interval. |
| 8 | Overridden due to AP multicast rate policy |
| 9-255 | Reserved |

Referring again to Table 4, the delivery interval field defines the number of DTIMs at which the stream is transmitted, as defined by the access point 14.

The FBMSID field is assigned by the access point 14 and provides a unique identifier (ID) for this stream within the BSS. The FBMS Counter ID provides a unique ID for the stream count within the BSS. A multicast rate specifies a data rate used for the multicast service. The multicast address specifies a multicast MAC address for the multicast address.

A multicast diagnostic interval field specifies the number of beacon intervals for which the access point keeps multicast service traffic counts. The station uses the multicast diagnostic interval to determine how frequently to send multicast diagnostic reports.

FBMS Operation

Using the FBMS request frame shown in Tables 1 and 2, the non-access point station 12 requests use of the FBMS by sending the FBMS request or reassociation request having all FBMS elements to which it wishes to subscribe. This is a declaration of all streams in which the station 12 is interested. For each stream, the station 12 proposes a delivery interval for the requested FBMS element.

Using the FBMS response frame shown in Tables 3 to 6, the access point 14 may adopt the proposed delivery interval, and provide an alternate delivery interval for the stream.

A status value of "Accept" is transmitted by the access point 14 when the requested delivery interval is supported by the access point.

A status value of "Deny" is transmitted by the access point when the access point denies the delivery interval requested by the station 12 and TCLAS completely.

A status value of "Override" is transmitted by the access point 14 when the access point 14 denies the requested delivery interval, but can support an alternate delivery interval form the requested TCLAS. The station should comply with the override value of the station 12. If the station 12 does not accept this overridden rate, then the station 12 should send a new request with the TCLAS element removed.

The FBMS delivery interval is always an integer multiple of DTIM period or zero. If the access point 14 denies the usage of FBMS for a particular traffic stream, normal broadcast and multicast transmission rules are applied.

The access point 14 should support up to eight different delivery intervals. Eight FBMS counters correspond to eight delivery intervals. Each counter decrements once per DTIM beacon and when the counter reaches "zero", the delivery interval expires. Upon expiry, the access point schedules for transmission of frames that exit in the broadcast/multicast streams assigned to each interval. Upon request from the station 12, the access point 14 assigns broadcast/multicast streams to a particular ID (FBMSID), negotiates the delivery interval and assigns a counter (FBMS counter ID) using the FBMS element.

The access point 14 uses AID 0 descriptor element in beacon frames to indicate the broadcast or multicast addresses where the buffered broadcast/multicast frames are targeted. This element is present only if the bit for AID 0 is set to 1.

Figure 6:
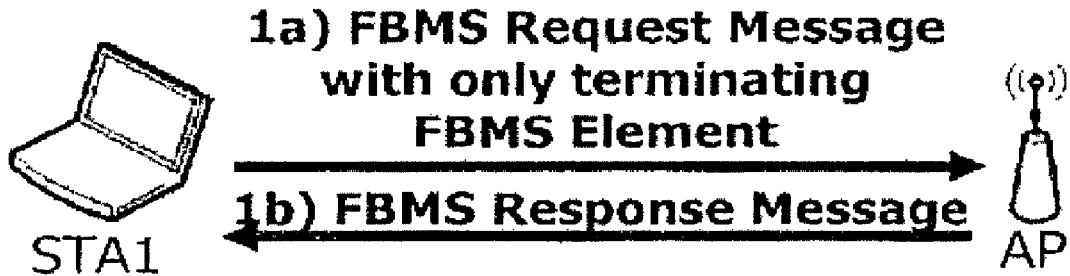
FIG. 6 is a flow chart illustrating processes of the wireless network system according to an exemplary embodiment of the present invention.

FIG. 6 is a flow chart illustrating processes of the wireless network system according to an exemplary embodiment of the present invention.

Referring to FIG. 6, a non-access point station (STA1) indicates that it is not longer using a specific FBMS element by sending a FBMS request frame including a FBMS element set to "0" during a delivery interval. Upon receipt of the FBMS request, the access point (AP) may send a FBMS response where a FBMS status value is set to "OK".

Figure 7:
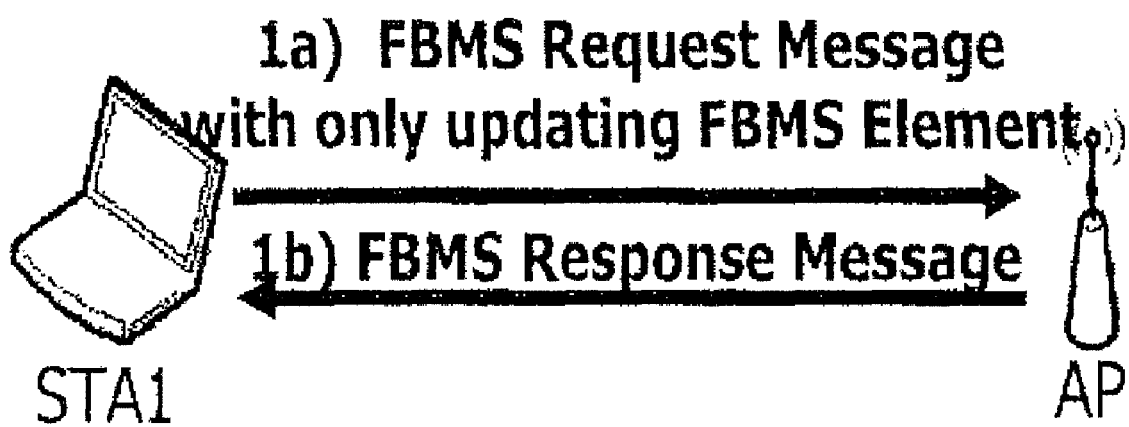
FIG. 7 is a flow chart illustrating processes of the wireless network system according to another exemplary embodiment of the present invention.

FIG. 7 is a now chart illustrating processes of the wireless network system according to another exemplary embodiment of the present invention.

Referring to FIG. 7, a non-access point station (STA1) indicates that FBMS information is updated by sending a FBMS request frame including only updated. Upon receipt of the FBMS request, the access point (AP) may send a FBMS response where a FBMS status value is set to "OK".

In this time, the FBMS status value set to "OK" may mean that a status value of a element status field is set to "Accept".

Upon receipt of the FBMS request, the access point (AP) may respond to the FBMS request frame of the non-access point station (STA1) by sending an ACK frame (Acknowledgment) that is one of control frames. On the other hand, the access point (AP) can respond to the FBMS request frame of the non-access point station (STA1) because it does not perform any operation after receipt of the FBMS request.

Upon receipt of the FBMS request, the access point (AP) may send the FBMS response frame that sets the status value of the FBMS status field to "Deny". As such, the access point (AP) may send the FBMS response frame that sets the status value of the FBMS status field to any value for the FBMS request frame, and may do not respond to the FBMS request frame.

Upon receipt of the FBMS request form the FBMS stream already assigned to the specific delivery interval and FBMS counter ID, the access point 14 may use a corresponding FBMS current count to assign a transmission time of the FBMS stream to a transmission time of the FBMS streams already received by the station 12. This is performed by enabling the access point 14 to change a current count. The current count can be changed only when same field values are held by two consecutive beacons to which the current count appears. An algorithm by which the access point 14 chooses to align or offset the FBMS counters different from each other is not specified.

The access point 14 may update the delivery interval for the FBMSID by sending an unsolicited FBMS response to the appropriate address with updated delivery interval when the current count reaches zero.

The wireless network system and communication method thereof according to the embodiment of the present invention informs the access point 14 that the non-access point station 12 is no longer using the corresponding FBMS element, by setting the delivery interval within an existing FBMS element to "0". Accordingly, the wireless network system and communication method thereof according to the embodiment of the present invention do not need to include all FBMS elements to remove or update on FBMS element, thereby allowing the FBMS request to be sent more effectively. As a result, the non-access point station 12 may effectively stop use the specific element.

2) indicating that the access point does no longer provide the FBMS service for the specific FBMS element As described above, the wireless network system does not indicate that the access point 14 ends the FBMS service for the specific FBMS element.

According to another embodiment of the present invention, the wireless network system and communication method thereof defines a status and it lease code informing that the access code 14 does no longer provide the FBMS service for the specific FBMS element.

Hereafter, a wireless network system and communication method thereof will be explained in detail. The repetition explanation will be omitted.

(1) FBMS Response

The FBMS response element defines information about the broad/multicast status. The format of the RBMS response element is shown in Table 7.

TABLE 7

| | Element ID | Length | FBMS Status Element 1 | FBMS Status Element n |
|---|---|---|---|---|
| Octets: | 1 | 1 | 5 | 5 |

The length field is set to 1+n, where n indicated the total length of FBMS elements included in the element. The format of the RBMS status element is shown in Table 8.

TABLE 8

| | Element Status | Delivery Interval | Element Reason Code | FBMSID | FBMS Counter ID | Multicast Rate | Multicast Address | Multicast Diagnostic Interval |
|---|---|---|---|---|---|---|---|---|
| Octets: | 1 | 1 | 1 | 1 | 1 | 1 | 6 | 4 |

Referring to Table 8, the element status field indicates the status of the access point 14 corresponding to the delivery interval requested by the station 12, as shown in Table 9.

TABLE 9

| Value | Description |
|---|---|
| 1 | Accept |
| 2 | Deny |
| 3 | Override |
| 4 | Terminate |
| 5-255 | Reserved |

The element reason code field provides additional explanation to the station when the status field returns "deny", "override" and "terminate". Values of the element reason code field is defined as shown in Table 10.

TABLE 10

| Field value | Description |
|---|---|
| 1 | Denied due to malformed request or ambiguous classifier. |
| 2 | Denied due to lack of resources on AP. |
| 3 | Denied due to requested classifier(s) matching 2 or more existing streams on different intervals |
| 4 | Denied. By policy, requested stream is not permitted to participate in FBMS |
| 5 | Overridden due to existing stream with different delivery interval |
| 6 | Overridden due to policy limits on AP. |
| 7 | Overridden due to AP changed the delivery interval. |
| 8 | Overridden due to AP multicast rate policy |
| 9 | Terminated due to lack of resources on AP |
| 10 | Terminated due to polity change on AP |
| 11 | Terminated due to getting busy network |
| 12-255 | Reserved |

Referring to Table 10, among values of the reason code fields, "1" indicates "Deny due to malformed request or ambiguous classifier", "2" indicates "Deny due to lack of resources on the access point 14", "3," indicates "Deny due to requested classifier(s) matching tow or more existing streams on different intervals", "4" indicates "Deny that by policy, requested stream is not permitted to participate in FBMS, "5" indicates "Override due to existing stream with different delivery interval, "6" indicates "Override due to policy limits on the access point 14, "7" indicates "Override due to the access point with the changed delivery interval, "8" indicates "Override due to multicast rate policy of the access point 14, "9" indicates "Terminate due to lack of resources of the access point 14, and "10" indicates "Terminate due to policy change on the access point.

Of course, values of the reason code may be newly defined except the above-described values.

Referring again to Table 8, the delivery interval field defines the number of DTIMs at which the stream is transmitted, as defined by the access point 14.

The FBMSID field is assigned by the access point 14 and provides a unique identifier (ID) for this stream within the BSS.

The FBMS Counter ID provides a unique ID for the stream count within the BSS. A multicast rate specifies a data rate used for the multicast service. The multicast address specifies a multicast MAC address for the multicast address.

A multicast diagnostic interval field specifies the number of beacon intervals for which the access point 14 keeps multicast service traffic counts. The station 12 uses the multicast diagnostic interval to determine how frequently to send multicast diagnostic reports.

(2) FBMS Operation

The access point 14 indicates that it supports the FBMS by using a wireless network management capability information element. The non-access point station 12 may indicate that it wishes to use the FBMS by using the wireless network management capability information element.

Using the FBMS request frame shown in Tables 1 and 2, the non-access point station 12 requests use of the FBMS by sending the FBMS request or reassociation request with all FBMS elements to which it wishes to subscribe. This is a declaration of all streams in which the station 12 is interested. For each stream, the station 12 proposes a delivery interval for the requested FBMS element.

Using the FBMS response frame shown in Tables 8 to 10, the access point 14 may adopt the proposed delivery interval, and provide an alternate delivery interval for the stream.

A status value of "Accept" is transmitted by the access point 14 when the requested delivery interval is not supported by the access point.

A status value of "Deny" is transmitted by the access point when the access point denies the delivery interval requested by the station 12 and TCLAS completely.

A status value of "Override" is transmitted by the access point 14 when the access point 14 denies the requested delivery interval, but can support an alternate delivery interval form the requested TCLAS. The station should comply with the override value of the station 12. If the station 12 does not accept this overridden rate, then the station 12 should send a new request with the TCLAS element removed.

The FBMS delivery interval is always an integer multiple of DTIM period. If the access point 14 denies the usage of FBMS for a particular traffic stream, normal broadcast and multicast transmission rules are applied.

The access point 14 may support up to eight different delivery intervals. Eight FBMS counters correspond to eight delivery intervals. Each counter decrements once per DTIM beacon and when the counter reaches "zero", the delivery interval expires. Upon expiry, the access point schedules for transmission of frames that exit in the broadcast/multicast streams assigned to each interval. Upon request from the station 12, the access point 14 assigns broadcast/multicast streams to a particular ID (FBMSID), negotiates the delivery interval and assigns a counter (FBMS counter ID) using the FBMS element.

The access point 14 uses AID 0 descriptor element in beacon frames to indicate the broadcast or multicast addresses where the buffered broadcast/multicast frames are targeted. This element is present only if the bit for AID 0 is set to 1.

A non-access point station 12 indicates that it is not longer using a specific FBMS element by sending a FBMS request frame including a FBMS element set to "0" during a delivery interval. Upon receipt of the FBMS request, the access point 14 may send a FBMS response where a FBMS status value is set to "OK".

When receiving the FBMS request for the FBMS stream that was already assigned to the particular delivery interval and the FBMS counter ID, the access point 14 can use the corresponding FBMS current counter to assign a transmission time of the FBMS stream to a transmission time of the FBMS streams already received by the station 12. This is performed by enabling the access point 14 to change the current count. The current count can be changed only when same field values are held by two consecutive beacons to which the current count appears. There does not specify an algorithm for enabling the access point to assign or offset selectively FBMS counters different from each other.

The access point 14 may update the delivery interval for the FBMSID by sending an unsolicited FBMS response to the appropriate address with updated delivery interval when the current count reaches zero. The access point 14 may end the specific element by sending the RBMS response without the request to an appropriate address with the reason code corresponding to "Terminate" as the status.

In the wireless network system and communication method thereof according to one embodiment of the present invention, the access point 14 may no longer provide the FBMS service for the specific FBMS element, thereby allowing the access point 14 to end the service for the specific FBMS element effectively.

3) confirming whether non-access point stations providing a FBMS service to a specific FBMS element are effective users The above-described wireless network system does not designate "Timeout" for the FBMS element at which the service is started once. Thus, when the non-access point station (non-AP STA) 12 that has requested the service for one FBMS element does not end the FBMS element and is disconnected with the access point (AP) 14, the service may be continuously provided to the access point 14, even when the station (STA) 12 is not existed for the specific FBMS element.

According to the wireless network system and communication method of the present invention, when the access point 14 sets a service period of the specific FBMS element and the set service period is end, the access point 14 ends the service for the FBMS element. Additionally, if the station 12 wishes to prolong the service period for the FBMS element, it transmits a FBMS request message for the FBMS element. Upon receipt of the FBMS request message, the access point 14 updates the service period for the corresponding FBMS element.

Hereafter, a wireless network system and communication method thereof according to another embodiment of the present invention will be explained in detail. The repetition explanation will be omitted.

The FBMS response defines information about the broadcast/multicast status. The format of the FBMS response element is shown in Table 7.

In this time, another example of the format of the FBMS status element is shown in Table 11.

TABLE 11

| | Element Status | Delivery Interval | Element Reason Code | FBMSID | FBMS Counter ID | Multicast Rate | Duration | Multicast Address | Multicast Diagnostic Interval |
|---|---|---|---|---|---|---|---|---|---|
| Octets: | 1 | 1 | 1 | 1 | 1 | 1 | 1 | 6 | 4 |

Referring to Table 11, Duration defined the number of DTIMs during a service period of the FBMS element. If the non-access point station 12 continues to use the same FBMS element after the service period, it may send a FBMS request in which the service period of the FBMS element is updated.

In the wireless network system and communication method according still another embodiment of the present invention, when the access point 14 sets a service period of the specific FBMS element and the set service period is end, the access point 14 stops provide the service for the FBMS element. Accordingly, when the station (non-AT STA) 12 is disconnected without stopping the usage for the specific elements, providing continuously an unnecessary service from the access point can be prevented.

As describe above, the duration indicating the service period of the FBMS element as the number of the DTIMs is included in the FBMS response frames, but not limited thereto. The duration 12 may be also included in the FEMS request frames to which the station 12 is transmitted. The FBMS request frames included in the duration may be sent from the station 12 to the access point 14. Then, the duration may be sent form the access point to the station 12, including the duration corresponding the FBMS status element of the FBMS response frame of Table 7.

As such, the station 12 may actively display the service period of one's own desired FBMS element by sending the FBMS request frames including the service period of the FBMS element. Meanwhile, the access point 14 assigns the service period to the corresponding station 12 with reference to the service period of the station's desired FBMS element, thereby allowing the resource to be effectively utilized.

For example, when the access point (AP) provides the FBMS service for four station (STA1 to STA 4) pertaining to the same multicast group, providing that the connection is disconnected because one station (STA1) has a very low multicast rate, other station (STA3, STA4) except one station (STA1) will send the FBMS request in which the service period is updated, before the service period of the FBMS element is expired. Next, the access point stops provide the FBMS service for one station (STA1), thereby allowing the multicast rate for the FBMS ID to be updated.

As another example, if four station (STA1 to STA4) do not perform the updated FBMS request until the service period of the FBMS element is expired, the access point may not provide the FBMS service for the FBMS stream. In other words, the access point may delete the FBMS ID and counter for the FBMS stream.

The embodiments of the present invention have been explained with reference to the drawing, but not limited thereto.

Therefore, the present invention can send and receive various information and data related to the broadcast or multicast service in the wireless network.

The embodiments of the present invention have been described for illustrative purposes, and those skilled in the art will appreciate that various modifications, additions and substitutions are possible without departing from the scope of the present invention should be defined by the appended claims and their legal equivalents.

What is claimed is:

1. A method of terminating a multicast service in a wireless communication system, the method comprising:
   transmitting, by a station to an access point, a first request frame including a TCLAS element to define a multicast stream and a first delivery interval field to indicate a delivery interval which is a periodicity for transmission of the multicast stream in units of Delivery Traffic Indication Maps (DTIMs);
   receiving, by the station from the access point, a response frame to establish the multicast service, the response frame indicating an acceptance of the delivery interval for the multicast stream; and
   transmitting, by the station to the access point, a second request frame to terminate the multicast service, the second request frame including a second TCLAS element to identify the multicast stream and a second delivery interval field set to zero indicating that the station does not use the multicast stream.

2. The method of claim 1, wherein the response frame includes an element status field indicating the acceptance of the delivery interval for the multicast stream.

3. The method of claim 1, further comprising:
   receiving, by the station from the access point, the multicast stream at the delivery interval indicated in the first delivery interval field before transmitting the second request frame.

4. The method of claim 1, wherein the station is a non-access point station.

5. A station for terminating a multicast service in a wireless communication system, the station comprising:
   means for transmitting, to an access point, a first request frame including a TCLAS element to define a multicast stream and a first delivery interval field to indicate a delivery interval which is a periodicity for transmission of the multicast stream in units of Delivery Traffic Indication Maps (DTIMs);
   means for receiving, from the access point, a response frame to establish the multicast service, the response frame indicating an acceptance of the delivery interval for the multicast stream; and
   means for transmitting, to the access point, a second request frame to terminate the multicast service, the second request frame including a second TCLAS element to identify the multicast stream and a second delivery interval field set to zero indicating that the station does not use the multicast stream.

6. The station of claim 5, further comprising:
   means for receiving, from the access point, the multicast stream at the delivery interval indicated in the first delivery interval field before transmitting the second request frame.

* * * * *